United States Patent Office 3,449,993
Patented June 17, 1969

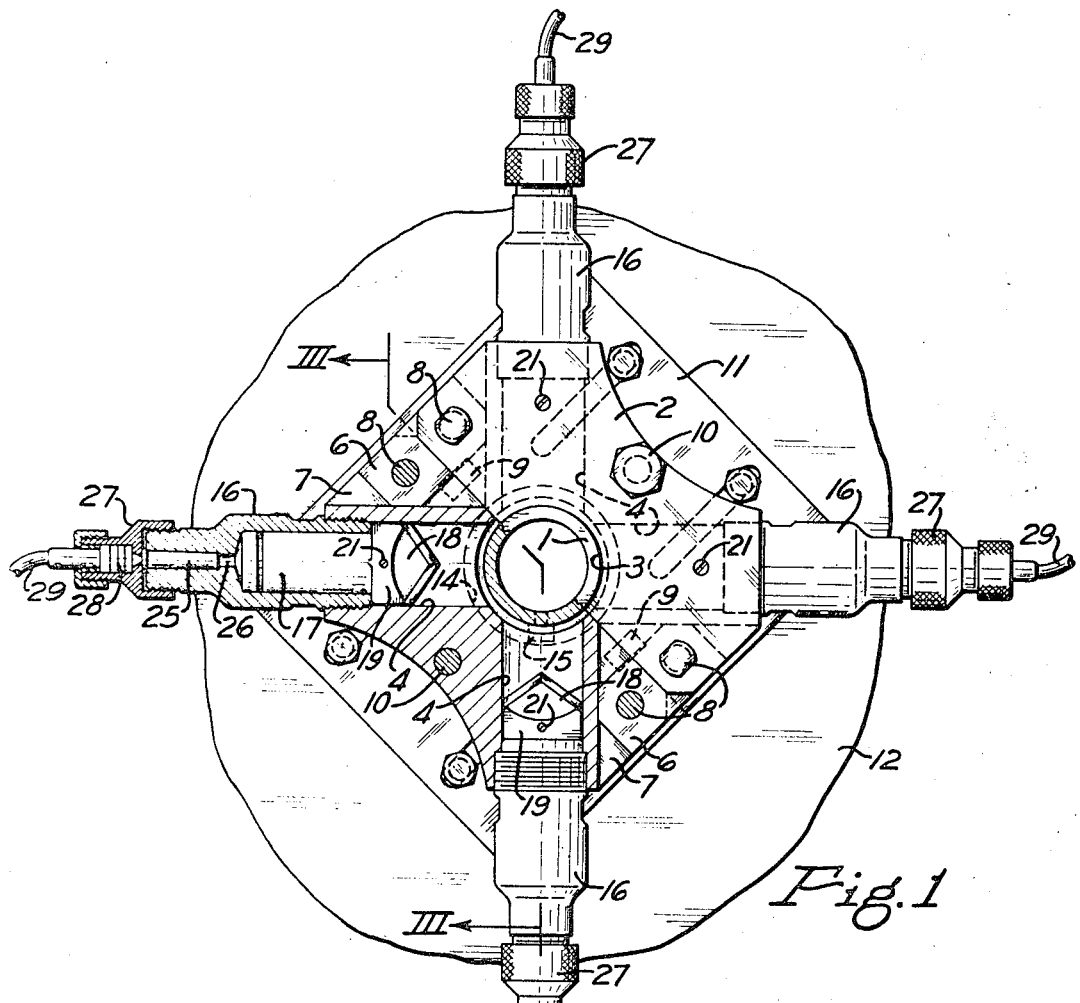
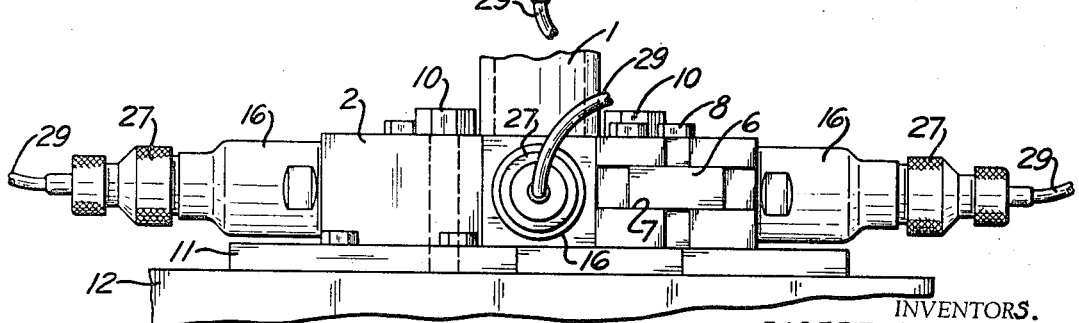

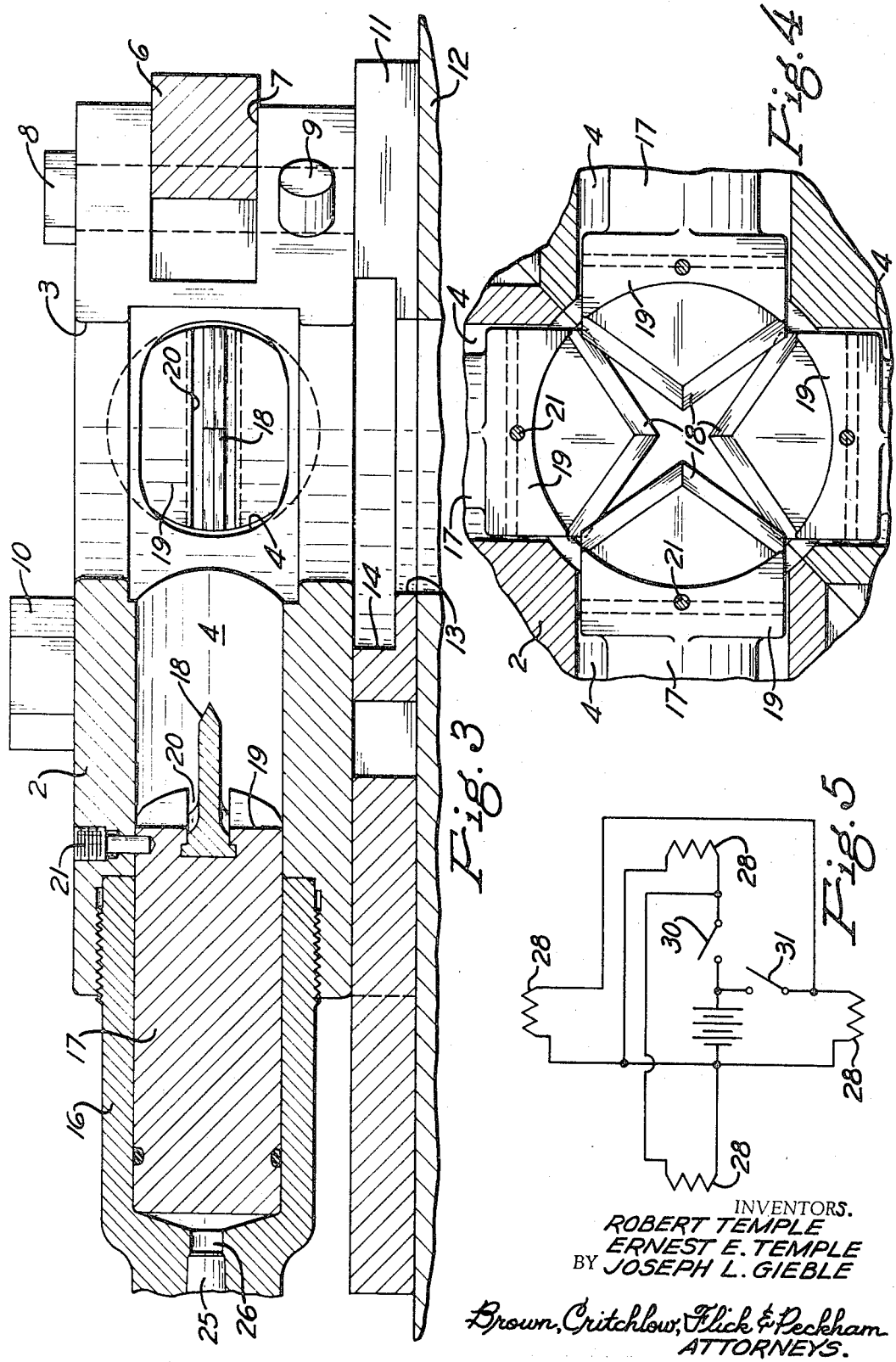

3,449,993
HEAVY DUTY PIPE CUTTING TOOL
Robert Temple, Pittsburgh, Ernest E. Temple, Murrysville, and Joseph L. Giebel, Pittsburgh, Pa., assignors to Mine Safety Appliances Company, Pittsburgh, Pa., a corporation of Pennsylvania
Filed Jan. 9, 1967, Ser. No. 607,932
Int. Cl. B26d 5/12, 3/00, 11/00
U.S. Cl. 83—639                6 Claims

ABSTRACT OF THE DISCLOSURE

A heavy duty pipe cutting tool has a frame with a central opening to receive a pipe. Radiating from the opening there are four equally spaced passages containing pistons provided with cutting blades at their inner ends. At the outer ends of the passages are means for holding and firing explosive charges to drive the blades toward each other and part way across the frame opening to cut a pipe therein.

---

Small or light-weight pipe has been cut heretofore by explosively actuated tools, in which a single cutting blade has been used. However, when large tubes or pipes having thick walls and formed from high strength material are to be cut, a single cutting blade is not at all feasible because the tool would have to be so large and cumbersome that it would not be practicable.

It is among the objects of this invention to provide a pipe cutting tool which is satisfactory for heavy duty cutting, which can be quickly applied to and removed from a pipe, which has a comparatively small and light-weight frame, and which is simple and inexpensive in construction and operation.

In accordance with this invention, a tool frame is provided with a central pipe-receiving opening extending through it and with at least one pair of aligned passages extending radially outward from opposite sides of the opening. In each passage there is a piston that is provided with a cutting blade at its inner end spaced outwardly from the central opening. At the outer ends of the passages there are means for holding and firing explosive charges for driving the blades toward each other and part way across the opening. The two blades thus exert equal pressures against opposite sides of the pipe so that the frame at one side of the opening is not subjected to the force of the blade at the other side of the opening. Preferably, four blades are used, each one disposed at 90° to the ones beside it. With this arrangement, each blade has to cut only a quarter section of the pipe.

The preferred embodiment of the invention is illustrated in the accompanying drawings, in which FIG. 1 is a plan view, partly in section;
FIG. 2 is a side view;
FIG. 3 is an enlarged vertical section taken on the line III—III of FIG. 1;
FIG. 4 is a fragmentary horizontal section showing the blades in pipe-cutting position; and
FIG. 5 is an electric wiring diagram.

Referring to the drawings, the frame of the tool is shown disposed horizontally for cutting an upright tube or pipe 1, although the tool could be used on edge for cutting a horizontal pipe. The frame includes a central housing 2 made from a heavy block of metal and provided with a central vertical opening 3 through it for receiving the pipe that is to be cut. Radiating from this opening are at least two axially aligned bores 4 extending out through the sides of the housing. For best results, there are two pairs of these bores, one pair being perpendicular to the other pair. The bores, as shown in FIG. 3, are not circular in cross section, for a purpose that will appear later. Although in some cases the housing could be slipped over the end of a pipe that is to be cut, generally that will not be possible so the housing is separated into two parts meeting along a line extending radially through the center of its central opening. The joint is at 45° to the bores 4.

To hold the two parts of housing 2 together after they have been applied to a pipe, there are tie bars 6 that fit in recesses 7 in the housing at the opposite ends of the joint between the two parts. The two bars span that joint. The ends of the bars are provided with openings that receive screws 8 extending down through the housing above the bars and screwed into the housing below them. To assure good alignment of the two parts of the housing, dowel pins 9 are inserted in aligned holes in the two parts as they are assembled.

The two parts of the housing may also be attached by bolts 10 to a supporting plate 11 that likewise is made in two parts usually bolted down to a support 12. This plate is provided with an opening 13 (FIG. 3) at least as large as the one through the housing above it. The two openings are aligned with each other. The wall of the plate opening may be provided with an upwardly opening recess 14 for receiving and supporting below the housing a stud 15 projecting from the side of the pipe being cut. In such a case, the stud is used for supporting the pipe while it is cut above the stud. The usual practice is to provide the wall of the plate opening with an annular recess for this purposes and to drive at least two studs into the pipe in order to support it from the plate.

Attached to the outer end of each housing bore 4 is a barrel 16. Preferably, the inner end of the barrel is screwed into the outer end of the bore. The bore and barrel together form a passage, in which there is a piston 17 that is provided at its inner end with a cutting blade 18. The piston fits the barrel snugly and projects into the adjoining bore, where the piston has a non-circular head 19 of a size and shape to fit the bore. This head is shown in FIG. 3 provided with a transverse slot 20, in which the cutting blade is removably mounted. The piston normally is held back in the barrel by a shear screw 21. The blade is horizontal and tapers to a point. It is much thinner than the head of the piston, which prevents the blade from turning in the bore. The inner face of the piston head above and below the blade is curved transversely to the same extent as the central opening in the housing, so that when the blade is driven into a pipe in that opening the curved face on the head will strike the side of the pipe and stop the blade, as shown in FIG. 4.

The four pistons are driven forward in the passages by means of explosive charges in cartridges 25 seated in cartridge chambers 26 at the outer ends of barrels 16. A breech block 27 is screwed onto the outer end of each barrel and contains a primer 28 that is detonated electrically in a well known manner through wires 29 extending out of the breech block. As shown in FIG. 5, the electric circuit is such that two opposite cartridges can be fired simultaneously by closing a switch 30 shown in FIG. 5, and then the other two cartridges can be fired simultaneously immediately afterward by closing another switch 31. The width of the blades is such that after all four have been driven into the pipe, it has been cut around its entire circumference, as shown in FIG. 4. To prevent the second pair of blades from jamming into the first pair, one pair of bores 4 is offset a slight distance vertically relative to the other pair, thereby permitting the edges of the blades to overlap.

Due to the fact that a pair of blades oppose each other and are driven toward each other at the same moment, the frame does not have to be made large and strong enough to resist the pressure against it of a pipe that is cut entirely from one side by a single blade. Also, since each blade in a pair has to cut through only one wall thickness, the tool does not have to be built strong enough to drive a blade completely through the pipe, which would require a great deal more power. Even at that, this tool can develop 9000 foot pounds of pressure on each piston, and as each blade only cuts a quarter segment of the pipe, thick wall pipes made of high strength alloys such as nickel-steel can be cut. For example, this tool has cut satisfactorily nickel-steel pipes 3 7/16 inches in outside diameter, with a sidewall 9/16 inch thick.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A heavy duty pipe cutting tool comprising a frame provided with a central pipe-receiving opening extending therethrough and with a first pair of aligned passages extending radially outward from opposite sides of said opening, a second pair of aligned passages extending radially outward from opposite sides of said opening at 90° to said first pair, a piston in each passage provided with a tapered cutting blade at its inner end space outwardly from said opening, means at the outer ends of the passages for holding and firing explosive charges to drive said blades forward toward each other and part way across said opening, and means for stopping the blades in each pair before they can strike each other, the blades in one pair being positioned to overlap those in the other pair sufficiently when all blades are in their forward positions to sever a pipe in said frame opening.

2. A heavy duty pipe cutting tool according to claim 1, in which each of said blades is tapered at an angle more than 90°.

3. A heavy duty pipe cutting tool according to claim 1, in which said stopping means are formed by the inner ends of the pistons, which are thicker than the blades to form shoulders for striking a pipe at opposite sides of the cut made therein, the shape of the shoulders conforming to the shape of the pipe to provide substantial areas of contact.

4. A heavy duty pipe cutting tool according to claim 1, in which said frame is substantially horizontal and supported on a plate provided with a pipe-receiving opening at least as large as said central opening and aligned therewith, the frame and the plate being separated into two parts along a vertical plane extending diametrically across said openings, the tool including removable means normally holding said parts firmly together, and the wall of said plate opening is provided with an upwardly opening recess for receiving and supporting a stud projecting from the side of a pipe being cut, whereby the plate can support the pipe while it is being cut above the stud.

5. A heavy duty pipe cutting tool according to claim 1, in which said frame is formed from two parts engaging each other along a line extending radially through the center of said central opening and bisecting the angle between pairs of adjacent blades, and said tool includes means for detachably connecting said two frame parts together.

6. A heavy duty pipe cutting tool according to claim 1, in which said firing means include electric firing elements, a normally open electric circuit for the firing elements of each pair of opposed blades, and means for closing the two circuits consecutively.

References Cited

UNITED STATES PATENTS

| | | | |
|---|---|---|---|
| 3,374,697 | 3/1968 | Robinson | 83—54 |
| 1,933,694 | 11/1933 | Allen et al. | 83—639 |
| 3,024,530 | 3/1962 | Haskell et al. | 30—92 |
| 1,922,529 | 8/1933 | Day. | |
| 3,234,838 | 2/1966 | Faull | 83—454 |

ANDREW R. JUHASZ, *Primary Examiner.*

J. F. COAN, *Assistant Examiner.*

U.S. Cl. X.R.

83—54, 519